(12) United States Patent
Kim

(10) Patent No.: US 8,013,834 B2  
(45) Date of Patent: Sep. 6, 2011

(54) DISPLAY APPARATUS AND MOBILE COMMUNICATION TERMINAL HAVING THE SAME

(75) Inventor: Jae-Min Kim, Gunpo (KR)

(73) Assignee: LG Electronics Inc., Seoul (KR)

( * ) Notice: Subject to any disclaimer, the term of this patent is extended or adjusted under 35 U.S.C. 154(b) by 766 days.

(21) Appl. No.: 11/482,904

(22) Filed: Jul. 10, 2006

(65) Prior Publication Data

US 2007/0030275 A1    Feb. 8, 2007

(30) Foreign Application Priority Data

Aug. 4, 2005  (KR) .................. 10-2005-0071444

(51) Int. Cl.  
*G09G 3/34*   (2006.01)

(52) U.S. Cl. ........................ 345/156; 345/173

(58) Field of Classification Search .......... 345/173–177, 345/156  
See application file for complete search history.

(56) References Cited

U.S. PATENT DOCUMENTS

| | | | |
|---|---|---|---|
| 3,668,337 A * | 6/1972 | Sinclair | 200/5 A |
| 6,031,524 A * | 2/2000 | Kunert | 345/173 |
| 6,888,538 B2 * | 5/2005 | Ely et al. | 345/173 |
| 6,919,927 B1 * | 7/2005 | Hyodo | 348/333.02 |
| 6,956,627 B2 * | 10/2005 | Lee | 349/58 |
| 7,106,307 B2 * | 9/2006 | Cok | 345/173 |
| 7,170,500 B2 * | 1/2007 | Canova, Jr. | 345/173 |
| 2004/0046906 A1 * | 3/2004 | Lee | 349/58 |
| 2004/0207605 A1 * | 10/2004 | Mackey et al. | 345/173 |
| 2005/0052425 A1 * | 3/2005 | Zadesky et al. | 345/173 |
| 2005/0285991 A1 * | 12/2005 | Yamazaki | 349/58 |
| 2006/0026521 A1 * | 2/2006 | Hotelling et al. | 715/702 |
| 2007/0052691 A1 * | 3/2007 | Zadesky et al. | 345/173 |

* cited by examiner

*Primary Examiner* — Alexander Eisen  
*Assistant Examiner* — Viet Pham  
(74) *Attorney, Agent, or Firm* — Birch, Stewart, Kolasch & Birch, LLP

(57) ABSTRACT

A display apparatus and a mobile communication terminal having the same. The display apparatus according to an aspect of the present invention comprises: a case; a display module mounted in the case for outputting visual information; a window mounted at a window groove of the case, and providing a visual passage through which the visual information can be seen from outside; and a signal generating unit mounted between the window and the display module, for generating a signal when the window is pressed. An additional input button for controlling an output from the display module need not be provided.

13 Claims, 4 Drawing Sheets

DISPLAY APPARATUS AND MOBILE COMMUNICATION TERMINAL HAVING THE SAME

The present application claims priority to Korean Patent Application No. 10-2005-0071444 filed on Aug. 4, 2005, the entire contents of which are herein fully incorporated by reference.

BACKGROUND OF THE INVENTION

1. Field of the Invention

The present invention relates to a display apparatus and a mobile communication terminal having the display apparatus, and more particularly, to a display apparatus mounted at an electronic device and outputting visual information, and a mobile communication terminal having the display apparatus.

2. Description of the Related Art

A display apparatus serves to output various visual information such as a text, a still image, a moving image, etc. according to commands inputted by an input unit.

The display apparatus and the input unit according to a related art will be explained with reference to FIG. 1.

FIG. 1 is a perspective view showing a mobile communication terminal having a display apparatus and input buttons in accordance with the related art.

As shown, the related art mobile communication terminal comprises a body portion 200 having a plurality of input buttons for inputting information, and having a main printed circuit board (PCB) (not shown) for controlling each component; and a folder portion 300 having an internal LCD panel (not shown) for displaying images at an inner surface thereof and rotatably coupled to the body portion 200.

An external LCD panel 330 for outputting image information such as a photo, etc. and information relevant to an MP3 player even when the folder portion 300 is closed, and a plurality of input buttons 340 for inputting information relevant to each kind of function are provided at an outer surface of the folder portion 300.

In the related art mobile communication terminal, a certain space for the plurality of input buttons 340 for inputting information relevant to each kind of function has to be obtained at the outer surface of the folder portion 300. Accordingly, a spatial utilization degree and a design freedom degree of the outer surface of the folder portion 300 are lowered.

Furthermore, since the plurality of input buttons 340 are exposed to the outer surface of the folder portion 300, a complicated appearance of the mobile communication terminal is created and a certain design of the mobile communication terminal is not implementable.

SUMMARY OF THE INVENTION

Therefore, an object of the present invention is to provide a display apparatus capable of generating an input signal by being operated.

Another object of the present invention is to provide a mobile communication terminal having a display apparatus capable of improving a design freedom degree and thus implementing a fine appearance, by integrating input buttons for controlling each function according to a signal outputted from the display apparatus into the display apparatus.

Another object of the present invention is to provide a mobile terminal having display and input functions, which addresses the limitations and disadvantages associated with the related art.

To achieve these and other advantages and in accordance with the purpose of the present invention, as embodied and broadly described herein, there is provided a display apparatus, comprising: a case; a display module; a window; and a signal generating unit.

According to one aspect of the present invention, the case has a certain inner space, and the display module is installed at the inner space. The window is installed at a window groove, so that information outputted from the display module can be seen from outside of the case. The signal generating unit is formed between the window and the display module, and generates a specific signal for controlling visual information outputted from the display module when the window is pressed. Therefore, additional input buttons for controlling each function according to signals need not be arranged outside the case. That is, since the window serves as the input unit, a design freedom degree of the outer surface of the case is improved and the design of the case can be simplified.

According to another aspect of the present invention, a limiting unit for rotating the window towards only an inner side of the case and preventing the window from being deviated outside the case is formed between the case and the window. More concretely, the limiting unit includes a stepped portion formed at an inner surface of the case with a step, and a stopping portion protruding from a side surface of the window so as to be engaged with the stepped portion. A spacer elastically supports the window on the display module. Accordingly, a certain space is formed between the display module and the window. When the window is pressed, the spacer is elastically deformed and thus the window is rotated in the space. The signal generating unit includes a circuit board arranged on the display module, and a pressing switch formed on the circuit board and generating a signal when the window is pressed. The circuit board can be an FPCB electrically connected to the display module, or can be the display module itself. The display module is composed of a display body and a display panel. Since the display body is a printed circuit board, the circuit board indicates the display body.

According to another aspect of the present invention, a pressing protrusion for pressing the pressing switch when the window is pressed is protrudingly formed at a position of the inner surface of the window corresponding to the pressing switch. The pressing protrusion is formed of an elastic material, thereby providing a better click feeling at the time of pressing the window. The window includes a center portion having an area corresponding to the display panel, and an extended portion extended from the center portion. The pressing protrusion is arranged at a side surface of the extended portion, and the pressing switch is arranged in correspondence to the pressing protrusion. Accordingly, when a signal is generated through the pressing switch accordingly as the window is pressed, the display panel is not influenced. An indicator is installed at the extended portion, and informs each function to be implemented so as to control visual information outputted from the display module when a specific part of the extended portion is pressed. Accordingly, the user can easily recognize which part of the window has to be pressed in order to implement his desired function.

To achieve these and other advantages and in accordance with the purpose of the present invention, as embodied and broadly described herein, there is also provided a mobile communication terminal having the display apparatus, comprising: a terminal body; and the display apparatus mounted at the terminal body. In the display apparatus, additional input buttons are not provided at an outer surface of the terminal body thereby to improve a design freedom degree of the outer surface of the terminal body. Furthermore, since a plurality of input buttons are not exposed outside the terminal body, an appearance degradation of the terminal body is prevented.

The present invention according to another aspect discloses a folder type mobile communication terminal. However, the present invention can be also applied to various types of mobile communication terminals such as a bar-type, a flip-type, a slide-type, a swivel-type mobile communication terminal, etc.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a display apparatus and a mobile communication terminal having the display apparatus according to the preferred embodiments of the present invention will be explained with reference to the attached drawings.

Figure 1:
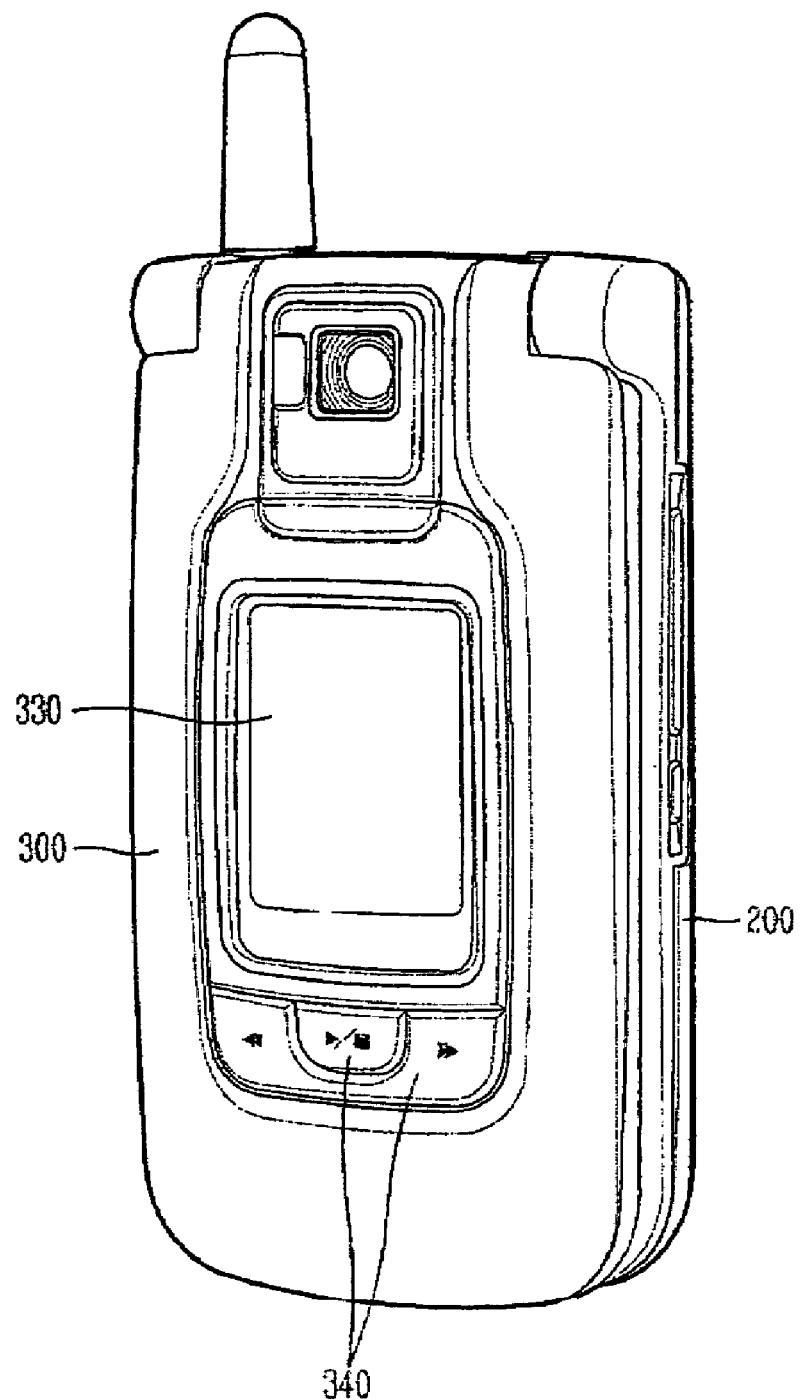
FIG. 1 is a perspective view showing a mobile communication terminal having a display apparatus and input buttons in accordance with the related art.
Figure 2:
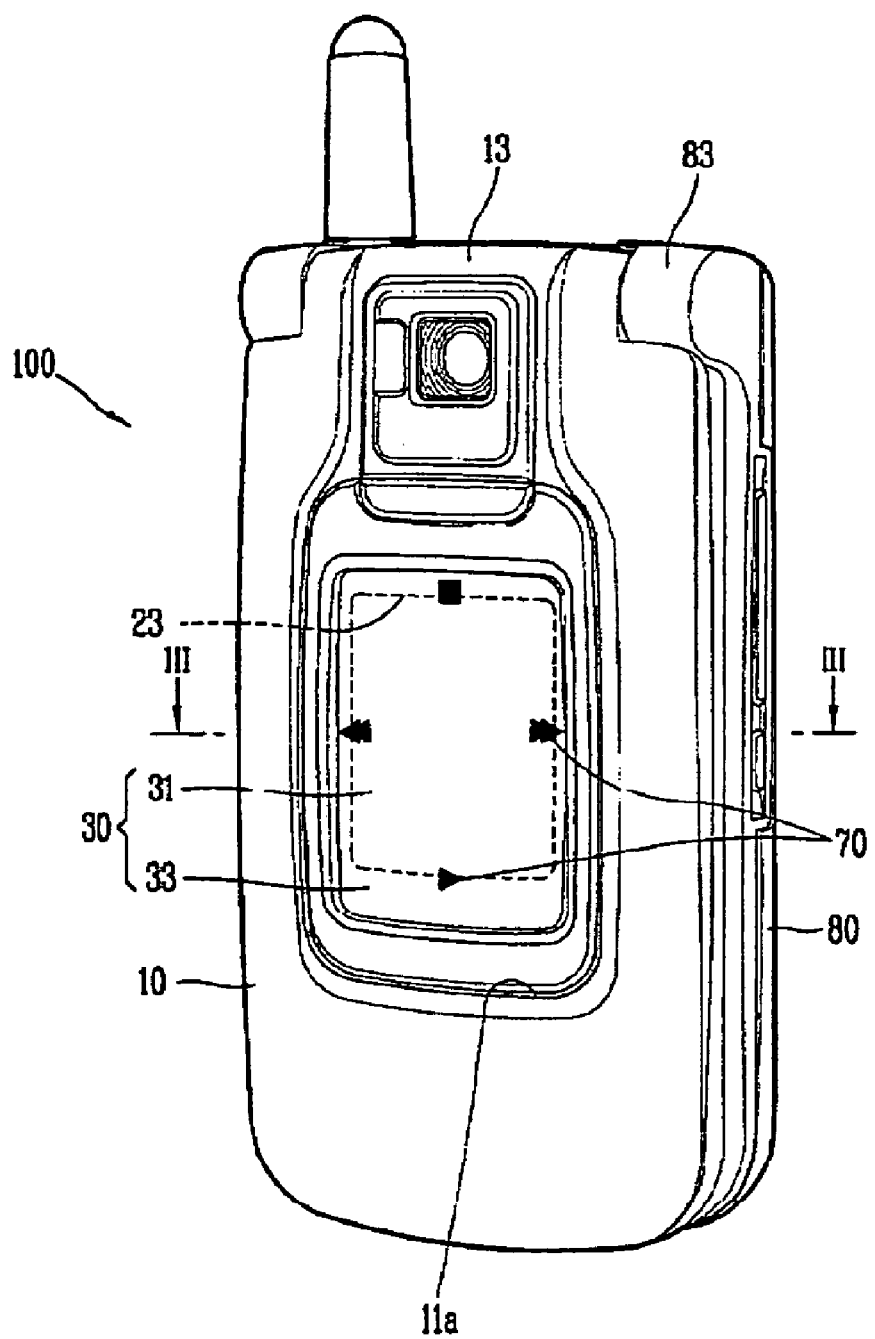
FIG. 2 is a perspective view showing a mobile communication terminal according to a first embodiment of the present invention.

FIG. 2 is a perspective view showing a mobile communication terminal according to a first embodiment of the present invention.

As shown, the mobile communication terminal according to the first embodiment of the present invention comprises a terminal body 100, and a display apparatus mounted at the terminal body 100.

The terminal body 100 is a terminal body of a folder-type mobile communication terminal in which a folder portion 10 is rotatably connected to a body portion 80. For the rotation, a folder hinge portion 13 formed at an upper edge of the folder portion 10 and a body hinge portion 83 formed at an upper edge of the body portion 80 are rotatably coupled to each other. The terminal body 100 is also referred to as a case.

A window 30 and an indicator 70 of the display apparatus are exposed outside the folder portion 10.

The window 30 is transparent and mounted at a window groove 11a of the folder portion 10, thereby providing a visual passage through which visual information outputted from an external display panel 23 arranged at a lower portion thereof can be seen from outside. The window 30 includes a center portion 31 having an area corresponding to the external display panel 23, and an extended portion 33 extended from the center portion 31.

The indicator 70 is formed generally on the extended portion 33, that is, an edge portion of the window 30. The indicator 70 displays each function performed according to a signal generated when the extended portion 33 is pressed.

A construction of the display apparatus will be explained in more detail with reference to FIG. 3.

Figure 3:
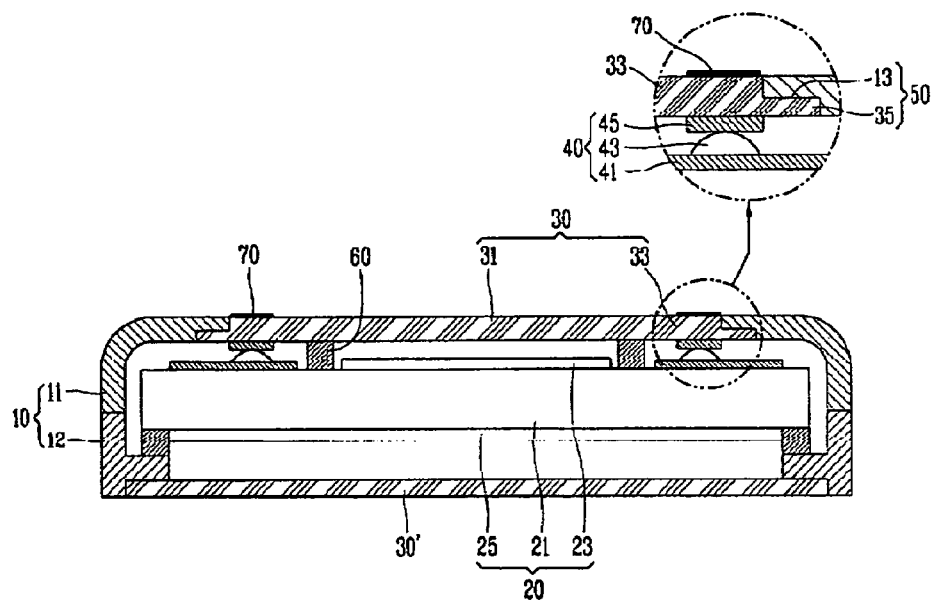
FIG. 3 is a sectional view showing a folder portion taken along line III-III of FIG. 2.

FIG. 3 is a sectional view showing a folder portion taken along line III-III of FIG. 2.

As shown, the display apparatus comprises a case or a folder portion 10, a display module 20, a window 30, and a signal generating unit 40.

The folder portion 10 forms an inner space accordingly as a first cover 11 and a second cover 12 are coupled to each other.

The display module 20 for outputting visual information, is a liquid crystal display (LCD) module, for example, but can be other types of display units. The display module 20 includes a display body 21 and display panels 23 and 25. The display body 21 is a printed circuit board (PCB) and is electrically connected to a main PCB mounted in the body portion 80, thereby controlling outputted visual information. The display panels 23 and 25 are electrically connected to the display body 21, thereby selectively outputting visual information according to the control of the display body 21. The display panels are composed of an external display panel 23 and an inner display panel 25. The external display panel 23 outputs visual information through the window 30 mounted at the outer side of the folder portion 10. Also, the inner display panel 25 outputs visual information through a window 30 mounted at the inner side of the folder portion 10 under a state that the folder portion 10 is opened from the body portion 80.

The window 30 includes the center portion 31 and the extended portion 33. The window 30 is transparent, and has a plate shape but can have other shapes. The window 30 is arranged to be approximately parallel with an outer surface of the folder portion 10. A stopping portion 35 is protruding at a side surface of the window 30, and is engaged with a stepped portion 13 formed at an inner surface of a wall that defines the window groove 11a of the first cover 11 with a step.

The signal generating unit 40 generates a specific signal by being pressurized when the window 30 is pressed. The signal generating unit 40 includes a circuit board 41 arranged on the display body 21, and a pressing switch 43 formed on the circuit board 41. The circuit board 41 is an FPCB electrically connected to the display body 21, but can be other types of circuit boards. The signal generating unit 40 can further include a pressing protrusion 45. The pressing protrusion 45 is protruding at a lower surface of the window 30, thereby enhancing a click feeling when the pressing switch 43 is pressed accordingly as the window 30 is pressed. The pressing protrusion 45 is preferably formed of an elastic material such as rubber, silicon, etc.

The display apparatus according to the first embodiment of the present invention can further comprise a limiting unit 50, a spacer 60, and an indicator 70.

The limiting unit 50 limits a motion of the window 30 on the folder portion 10, and includes the stepped portion 13 formed at the folder portion 10 and the stopping portion 35 formed at the window 30. The window 30 is rotated towards only an inner space of the folder portion 10 without being deviated outside the folder portion 10 by the stepped portion 13 and the stopping portion 35.

The spacer 60 elastically supports the window 30 on the display module 20, and is an elastic body arranged between the display body 21 of the display module 20 and the window 30. The spacer 60 elastically pressurizes the window 30 towards the folder portion 10 so that the stopping portion 35 of the window 30 can be engaged with the stepped portion 13 of the folder portion 10 without a gap. Furthermore, when the window 30 is pressed, the spacer 60 is elastically deformed thereby to provide a moving space of the window 30.

The indicator 70 is installed on the extended portion 33 of the window 30 thereby to inform specific information. Below each indicator 70, the pressing switch 43 and other components to activate the switch 43 are provided as discussed above.

An operation of the display apparatus according to the first embodiment of the present invention and a mobile communication terminal having the same will be explained with reference to FIGS. 4 and 5.

Figure 4:
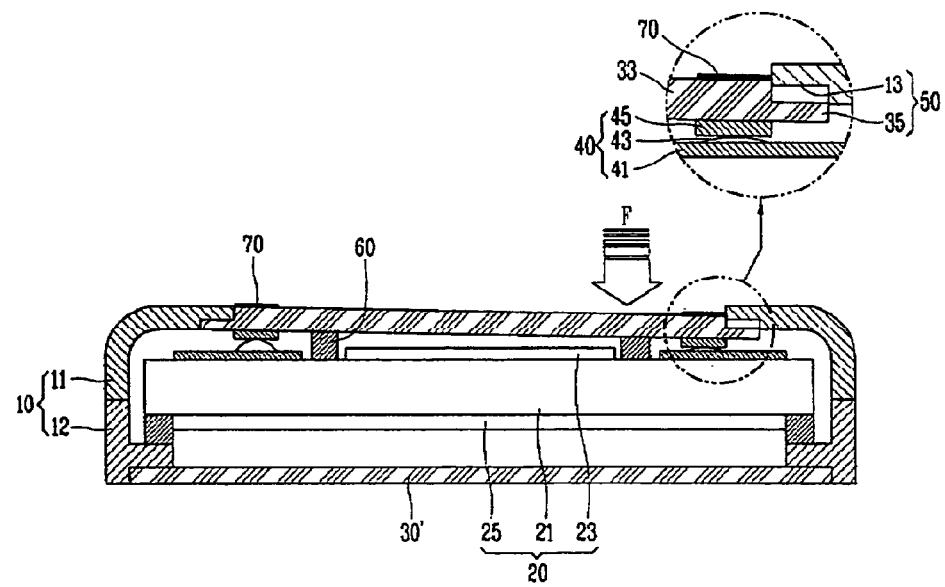
FIG. 4 is a sectional view showing a state that a window of a display apparatus of FIG. 3 has been pressed.

FIG. 4 is a sectional view showing an example of a state that the window 30 of the display apparatus of FIG. 3 has been pressed.

As shown, when a pressing force F is applied (e.g., by a user) to a specific part of the extended portion 33 of the window 30, the spacer 60 is elastically deformed and the window 30 is rotated on the basis of a part that has not been pressed. Accordingly, the stopping protrusion 35 of the side of the extended portion 33 where the pressing force F is applied is disengaged from the stepped portion 13.

As the window 30 is rotated, the pressing protrusion 45 presses against the pressing switch 43. When the pressing switch 43 is pressed, the circuit board 41 receives a signal and performs a specific function corresponding to the pressing switch 43. The performance result is outputted through the external display panel 23, and the user can see the result on the window 30.

Figure 5:
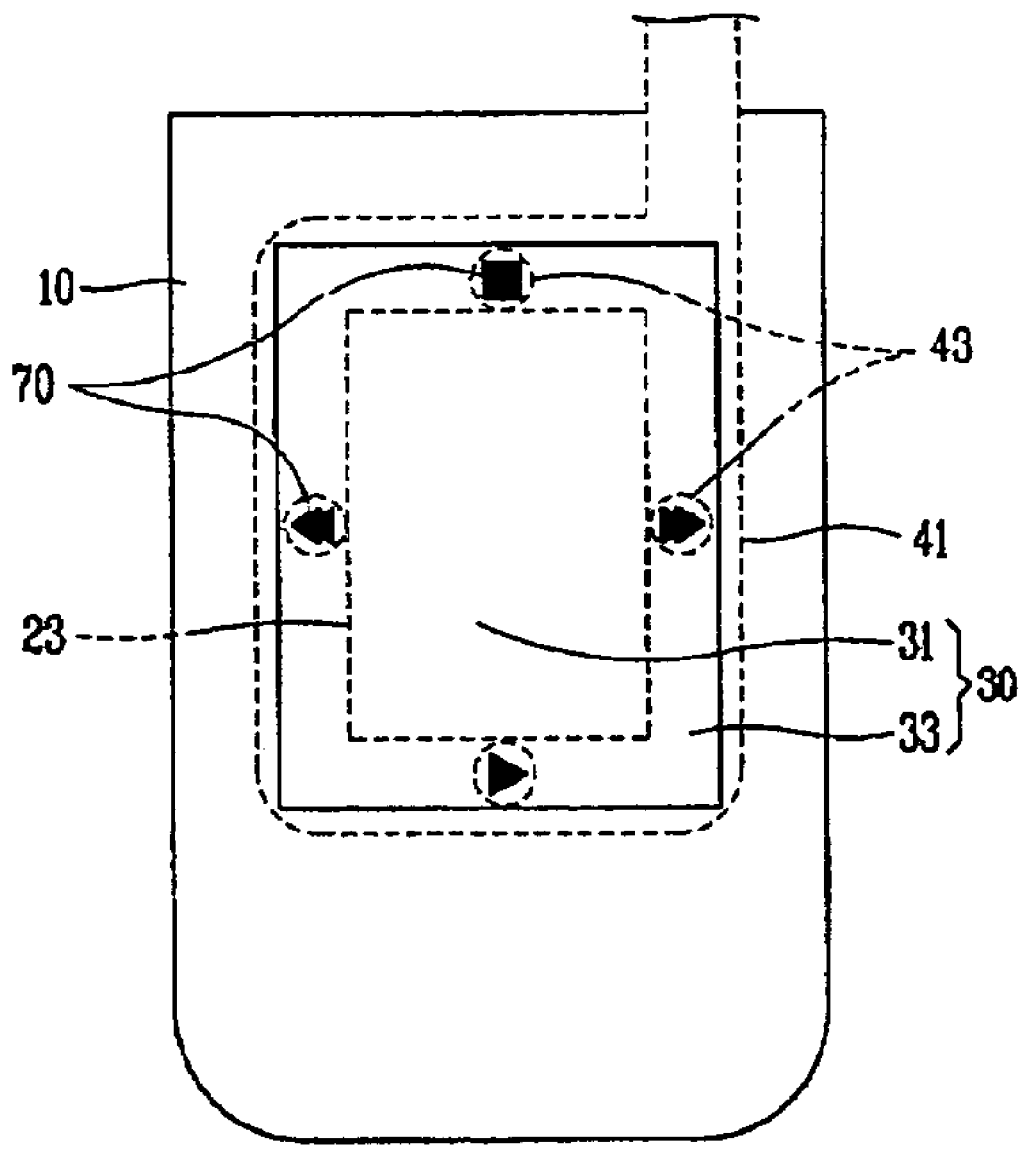
FIG. 5 is a conceptual view showing an operation of the folder portion of the mobile communication terminal of FIG. 2.

FIG. 5 is a conceptual view showing an example of an operation of the folder portion of the mobile communication terminal of FIG. 2.

As shown, the user recognizes each function of the mobile communication terminal by the indicator 70 formed on the extended portion 33 of the window 30, and presses the indicator 70 corresponding to his desired function. For instance, icons, menus, descriptions, etc. can be displayed on the external display panel 23. Then the user can view the displayed options and operate the four indicators 70 to make the selections that the user desires. Then according to the selection, an operation/function corresponding to the selection is performed and the external display panel 23 can indicate the progress/result of the selection, appropriately. Accordingly, various functions may be performed by a user without having to open up the folder portion 10. For instance, the user may access voice mail or text mail using only the indicators 70 and the external display panel 23, without flipping his phone open.

As a result, the specific pressing switch 43 corresponding to the specific indicator 70 is pressed, and the user's desired function is inputted to the mobile communication terminal through the circuit board 41. Accordingly, the circuit board 41 performs the user's desired function, and outputs a result of the specific function on the center portion 31 of the window corresponding to the external display panel 23.

It is also possible to directly form the pressing switch 43 on the display body 21 without additionally providing the circuit board 41 of the signal generating unit 40.

In a preferred embodiment of the present invention, only the window 30 is constructed to be pressed to perform specific operations/functions. However, the window 30' can be also constructed to be pressed to perform specific operations/functions.

Also, the display apparatus of the present invention is applied to a mobile communication terminal in a preferred embodiment. However, the display apparatus can be applied to other electronic devices such as an MP3 player, an electronic dictionary, a personal digital assistant (PDA), etc. Also, although four indicators 70 are shown, other types of indicators in different numbers may be used. Any different size and/or configuration of the external display panel 23 may be used.

As aforementioned, in the display apparatus of the present invention, the display panel also serves as an input button for controlling visual information outputted therefrom, thereby not requiring an additional input button.

The mobile communication terminal having the display apparatus of the present invention need not be provided with an additional space for installing input buttons. Therefore, the terminal body can be made to be compact, and a design freedom degree for the appearance of the terminal body is improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A display apparatus, comprising:
    a case;
    a display module mounted in the case and having a surface for outputting visual information, the visual information including an image formed on the surface of the display module;
    a window movably mounted on the case relative to the display module, and through which visual information is seen from outside;
    a spacer arranged between a display body of the display module and the window, the spacer being elastically-deformed when the window is pressed;
    a signal generating unit mounted between the window and the display module, for generating a signal when the window is pressed to be moved toward the display module, the signal generating unit including:
        a circuit board; and
        at least one pressable switch formed on the circuit board and applying a signal onto the circuit board when the window is pressed, the at least one pressable switch being located between the window and the circuit board, the at least one pressable switch being coplanar with the spacer; and
    a limiting unit formed between the case and the window, for rotating the window towards only an inner side of the case when the window is pressed whereby the window presses the at least one pressable switch.

2. The display apparatus of claim 1, wherein the display module comprises:
    a display body; and
    a display panel mounted at the display body so as to be electrically connected to the display body, for outputting visual information provided from the display body.

3. The display apparatus of claim 1, wherein the limiting unit comprises:
   a stepped portion formed at an inner portion of the case; and
   a stopping portion protruding from a side surface of the window so as to be engaged with the stepped portion.

4. The display apparatus of claim 1, wherein the circuit board is an FPCB electrically connected to the display module, and the pressing switch is a dome-shaped switch.

5. The display apparatus of claim 1, further comprising:
   a pressing protrusion protruding at an inner surface of the window, for pressing the at least one pressable switch when the window is pressed.

6. The display apparatus of claim 1, wherein the window comprises:
   a center portion corresponding to a display panel of the display module; and
   an extended portion outwardly extended from the center portion,
   wherein the signal generating unit is formed at a position corresponding to the extended portion.

7. The display apparatus of claim 6, further comprising:
   an indicator formed on the extended portion, for selecting and displaying each function performed according to a signal generated when the extended portion is pressed.

8. A mobile communication terminal, comprising:
   a terminal body; and
   a display apparatus mounted at the terminal body, for outputting visual information, wherein the visual information includes an image formed on the surface of the display module, and wherein the display apparatus comprises:
   a display module mounted in the terminal body and having a surface for outputting visual information, the display module having a display body and a display panel mounted on the display body so as to be electrically connected to the display body, for outputting visual information provided from the display body;
   a window movably mounted at a window groove of the terminal body relative to the display module, and through which visual information outputted by the display panel is seen from outside, the window being disposed above the display panel;
   a spacer arranged between the display body of the display module and the window, the spacer being elastically-deformed when the window is pressed; and
   a signal generating unit mounted between the window and the display module, for generating a signal when the window is pressed to be moved toward the display module, wherein the signal generating unit comprises:
   a circuit board; and
   at least one pressable switch formed on the circuit board and applying a signal onto the circuit board when the window is pressed, the at least one pressable switch being located between the window and the circuit board; and
   a limiting unit formed between the terminal body and the window, for rotating the window towards only an inner side of the terminal body when the window is pressed whereby the window presses the at least one pressable switch.

9. The mobile communication terminal of claim 8, wherein the limiting unit comprises:
   a stepped portion formed at an inner portion of the terminal body; and
   a stopping portion protruding from a side surface of the window so as to be engaged with the stepped portion.

10. The mobile communication terminal of claim 8, wherein the circuit board is an FPCB electrically connected to the display module, and the pressing switch is a dome-shaped switch.

11. The mobile communication terminal of claim 8, further comprising:
    a pressing protrusion protruding at an inner surface of the window, for pressing the at least one pressable switch when the window is pressed.

12. The mobile communication terminal of claim 8, wherein the window comprises:
    a center portion corresponding to a display panel of the display module; and
    an extended portion outwardly extended from the center portion,
    wherein the signal generating unit is formed at a position corresponding to the extended portion.

13. The mobile communication terminal of claim 12, further comprising:
    an indicator formed on the extended portion, for selecting and displaying each function performed according to a signal generated when the extended portion is pressed.

* * * * *